(12) United States Patent
Kawahara et al.

(10) Patent No.: US 9,490,493 B2
(45) Date of Patent: Nov. 8, 2016

(54) MANUFACTURING METHOD OF FUEL CELL, FUEL CELL AND FUEL CELL SYSTEM

(75) Inventors: Shuya Kawahara, Gotenba (JP); Akito Kawasumi, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/419,339

(22) PCT Filed: Aug. 9, 2012

(86) PCT No.: PCT/JP2012/005081
§ 371 (c)(1),
(2), (4) Date: Feb. 3, 2015

(87) PCT Pub. No.: WO2014/024224
PCT Pub. Date: Feb. 13, 2014

(65) Prior Publication Data
US 2015/0221966 A1  Aug. 6, 2015

(51) Int. Cl.
*H01M 8/04* (2016.01)
*H01M 8/24* (2016.01)

(52) U.S. Cl.
CPC ..... *H01M 8/04544* (2013.01); *H01M 8/04432* (2013.01); *H01M 8/04552* (2013.01); *H01M 8/24* (2013.01); *H01M 8/241* (2013.01); *Y02E 60/50* (2013.01); *Y02P 70/56* (2015.11)

(58) Field of Classification Search
CPC ............ H01M 8/04544; H01M 8/24; H01M 8/04432; H01M 8/04552; H01M 8/241
USPC ................................................ 429/452, 535
See application file for complete search history.

(56) References Cited

U.S. PATENT DOCUMENTS

| 6,210,820 | B1 | 4/2001 | Knights et al. |
| 6,673,480 | B1 | 1/2004 | Wilkinson et al. |
| 2010/0003549 | A1 | 1/2010 | Ota et al. |
| 2010/0173219 | A1* | 7/2010 | Ogawa ............. H01M 8/04089 429/458 |
| 2012/0038373 | A1* | 2/2012 | Ikeda ................ H01M 8/04641 324/691 |

FOREIGN PATENT DOCUMENTS

| JP | 2002-520778 A | 7/2002 |
| JP | 2002-313396 A | 10/2002 |
| JP | 2006-338921 A | 12/2006 |
| JP | 2007-048609 A | 2/2007 |
| JP | 2009-170229 A | 7/2009 |
| JP | 2010-503143 A | 1/2010 |

* cited by examiner

Primary Examiner — Sean P Cullen
(74) Attorney, Agent, or Firm — Andrews Kurth Kenyon LLP

(57) ABSTRACT

In order to define the power generation performance of a monitor cell, a manufacturing method of a fuel cell including a plurality of ordinary cells and a monitor cell configured to have a greater pressure loss of hydrogen gas than a pressure loss of the ordinary cell comprises the steps of: (a) specifying an upper limit voltage in a voltage range of the monitor cell; (b) specifying a lower limit voltage in the voltage range of the monitor cell; (c) determining an upper limit value and a lower limit value in a range of pressure loss of the hydrogen gas in the monitor cell, based on the upper limit voltage and the lower limit voltage; and (d) manufacturing the monitor cell, such that the pressure loss of the hydrogen gas in the monitor cell is limited to the range of pressure loss.

6 Claims, 8 Drawing Sheets

MANUFACTURING METHOD OF FUEL CELL, FUEL CELL AND FUEL CELL SYSTEM

CROSS-REFERENCE TO RELATED APPLICATION

This is a national phase application based on the PCT International Patent Application No. PCT/JP2012/005081 filed Aug. 9, 2012, the entire contents of which are incorporated herein by reference.

TECHNICAL FIELD

The present invention relates to a manufacturing method of a fuel cell, a fuel cell and a fuel cell system.

BACKGROUND ART

A fuel cell structured by stacking a plurality of cells has been known. The fuel cell receives supplies of oxygen and hydrogen and generates electricity through electrochemical reaction. The deficient supply of hydrogen to the fuel cell during warm-up operation in a subzero environment accordingly degrades the power generation performance of the fuel cell. The excessive dryness of an electrolyte membrane in the fuel cell during high-temperature operation also degrades the power generation performance of the fuel cell.

A technique described in Patent Literature 1 given below has been known to detect an abnormality of the fuel cell, for example, deficiency of hydrogen. The technique described in Patent Literature 1 provides a cell which has a voltage change in response to an abnormality at the higher sensitivity than ordinary cells or, in other words, which degrades the power generation performance earlier than the ordinary cells (hereinafter called monitor cell) in the fuel cell and monitors the voltage of this monitor cell, so as to detect an abnormality of the fuel cell.

CITATION LIST

Patent Literature

[PTL 1] JP 2002-520778A
[PTL 2] JP 2007-048609A
[PTL 3] JP 2009-170229A
[PTL 4] JP 2006-338921A

SUMMARY

Technical Problem

The disclosure of the above patent literature, however, has a problem that there is no consideration on the degree of decrease in power generation performance of the monitor cell relative to the power generation performance of the ordinary cells. Another problem is that when the power generation performance of the monitor cell is not sufficiently lower than the power generation performance of the ordinary cells, the monitor cell does not sufficiently work as a monitoring target. Yet another problem is that when the power generation performance of the monitor cell is excessively low, however, the voltage of the monitor cell decreases to a negative voltage of or below 0 V in response to an abnormality and causes degradation of the monitor cell. Other needs over the prior art fuel cell system include downsizing, cost reduction, resource saving, simplification of manufacture and improvement of usability.

Solution to Problem

The invention may be implemented by any of the following aspects, in order to solve at least part of the above problem.

(1) According to one aspect of the invention, there is provided a manufacturing method of a fuel cell including a plurality of ordinary cells and a monitor cell configured to have a greater pressure loss of hydrogen gas than a pressure loss of the ordinary cells. This manufacturing method comprises the steps of: (a) specifying an upper limit voltage in a voltage range of the monitor cell; (b) specifying a lower limit voltage in the voltage range of the monitor cell; (c) determining an upper limit value and a lower limit value in a range of pressure loss of the hydrogen gas in the monitor cell, based on the upper limit voltage and the lower limit voltage; and (d) manufacturing the monitor cell, such that the pressure loss of the hydrogen gas in the monitor cell is limited to the range of pressure loss. This aspect enables the voltage of the monitor cell to be limited to the voltage range of not lower than the lower limit voltage and not higher than the upper limit voltage. Accordingly, setting adequate values to the upper limit voltage and the lower limit voltage enables the monitor cell to effectively work as a monitoring target of a monitor, while suppressing the monitor cell from having a negative voltage in an abnormal state.

(2) In the manufacturing method of the fuel cell of the above aspect, the step (a) may comprise the steps of: (a1) individually measuring voltages of the plurality of ordinary cells and determining an average voltage of the plurality of ordinary cells; and (a2) specifying a value obtained by subtracting a specified value from the average voltage, as the upper limit voltage of the voltage range. This aspect causes the voltage of the monitor cell to be lower than the average voltage of the ordinary cells and thereby enables the monitor cell to effectively work as the monitoring target of the monitor.

(3) In the manufacturing method of the fuel cell of the above aspect, the step (a2) may comprise the steps of: (a2-1) determining a standard deviation of voltage of the plurality of ordinary cells; and (a2-2) specifying a three-fold value of the standard deviation as the specified value. This aspect causes the voltage of the monitor cell to be lower than the voltages of substantially all the ordinary cells and thereby enables the monitor cell to further effectively work as the monitoring target of the monitor.

(4) In the manufacturing method of the fuel cell of the above aspect, the step (b) may comprise the steps of: (b1) determining a voltage drop rate of the ordinary cell under a predetermined condition; (b2) determining a degree of voltage drop of the ordinary cell which is dropped during a monitoring cycle of a monitor configured to monitor voltage of the monitor cell, based on the voltage drop rate; and (b3) specifying the voltage drop degree as the lower limit voltage. This aspect suppresses the monitor cell from having a negative voltage, even in the case of a voltage drop of the monitor cell under the predetermined condition. The reason of such suppression is described. The monitor is configured to monitor the voltage of the monitor cell at every monitoring cycle. When the monitor cell has a voltage drop under the predetermined condition, the monitor detects the voltage drop of the monitor cell. When the monitor detects the voltage drop of the monitor cell, the output current of the fuel cell is limited to suppress a further voltage drop of the monitor cell. The voltage of the monitor cell is accordingly dropped only during the monitoring cycle at the maximum. The predetermined condition includes, for example, warm-up operation in a subzero environment or high-temperature operation in a high temperature environment of or over 90° C.

(5) In the manufacturing method of the fuel cell of the above aspect, the step (b1) may comprise determining a plurality of voltage drop rates under a plurality of conditions; the step (b2) may comprise determining a plurality of voltage drop degrees under the plurality of conditions; and the step (b3) may comprise specifying the plurality of voltage drop degrees as a plurality of lower limit voltages; and the step (c) may comprise determining a plurality of candidates for the upper limit value in the range of pressure loss and specifying a smallest candidate for the upper limit value among the plurality of candidates for the upper limit value as the upper limit value in the range of pressure loss. This aspect suppresses the monitor cell from having a negative voltage under any of the plurality of conditions.

(6) In the manufacturing method of the fuel cell of the above aspect, the step (c) may comprise the steps of (c1) determining a relationship between pressure loss of the hydrogen gas in the monitor cell and voltage of the monitor cell; and (c2) specifying the range of pressure loss corresponding to the voltage range, based on the relationship. This aspect specifies the range of pressure loss of the hydrogen gas in the monitor cell, in order to limit the voltage of the monitor cell to the voltage range between the upper limit voltage and the lower limit voltage.

(7) According to another aspect of the invention, there is provided a fuel cell. The fuel cell comprises: a plurality of ordinary cells; and a monitor cell configured to have a greater pressure loss of hydrogen gas than a pressure loss of the ordinary cells, wherein voltage of the monitor cell is equal to or lower than a value obtained by subtracting a specified value from an average voltage of the plurality of ordinary cells. This aspect causes the voltage of the monitor cell to be lower than the average voltage of the ordinary cells and thereby enables the monitor cell to effectively work as a monitoring target of a monitor.

(8) In the fuel cell of the above aspect, the voltage of the monitor cell may have a value that is equal to or greater than a degree of voltage drop of the ordinary cell which is dropped during a monitoring cycle of a monitor configured to monitor voltage of the monitor cell. This aspect suppresses the monitor cell from having a negative voltage, even in the case of a voltage drop of the monitor cell under the predetermined condition. The reason of such suppression is described. The monitor is configured to monitor the voltage of the monitor cell at every monitoring cycle. When the monitor cell has a voltage drop, the monitor detects the voltage drop of the monitor cell. When the monitor detects the voltage drop of the monitor cell, the output current of the fuel cell is limited to suppress a further voltage drop of the monitor cell. The voltage of the monitor cell is accordingly dropped only during the monitoring cycle at the maximum.

(9) According to another aspect of the invention, there is provided a fuel cell system. The fuel cell system includes the fuel cell of the above aspect and a monitor configured to monitor voltage of the monitor cell.

The invention may be implemented by a variety of aspects other than those described above; for example, design methods of a fuel cell and a fuel cell system, as well as a fuel cell and a fuel cell system designed and manufactured by these design methods.

DESCRIPTION OF EMBODIMENTS

Figure 1:
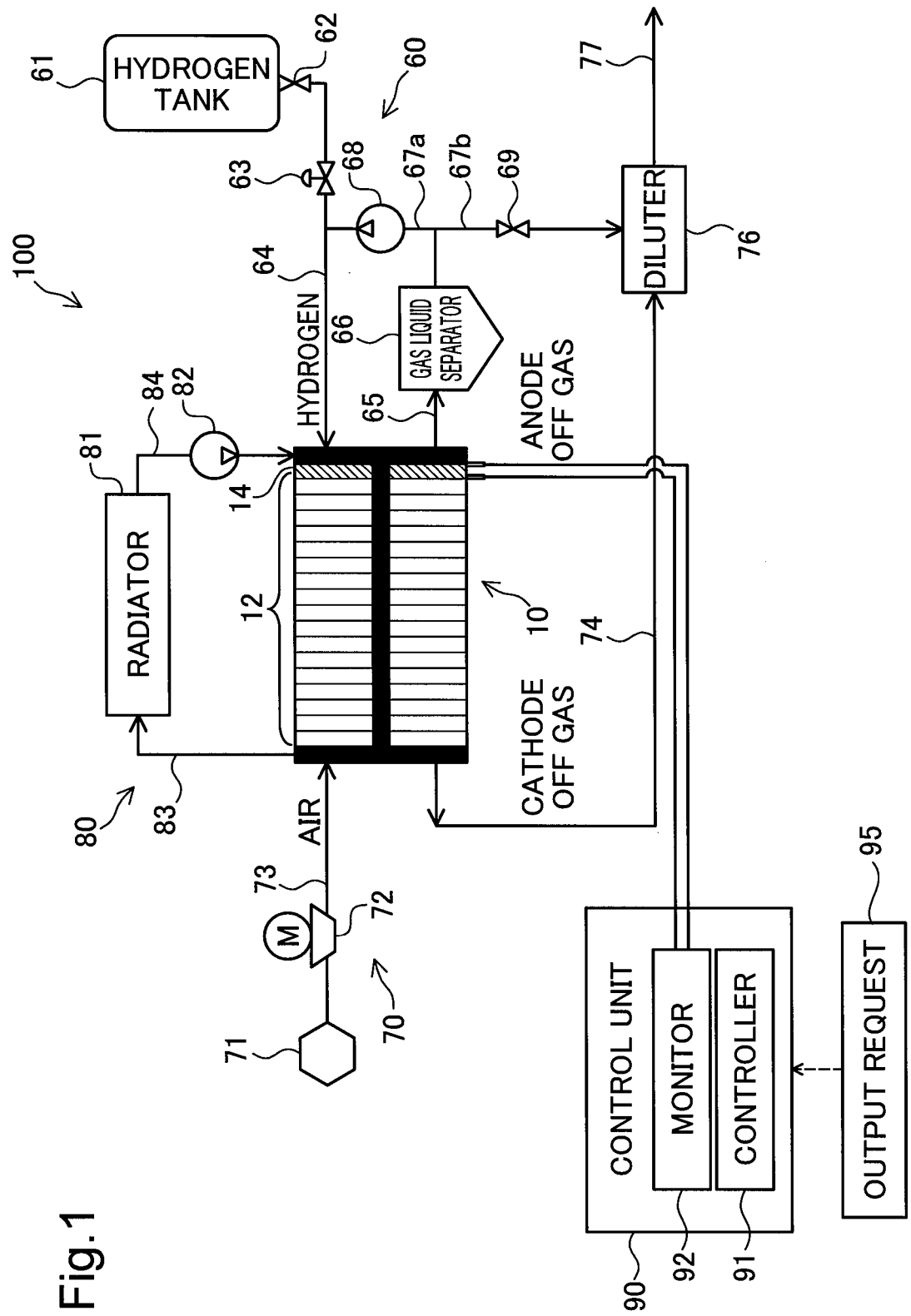
FIG. 1 is a diagram illustrating the general configuration of a fuel cell system according to one embodiment of the invention.

The following describes some aspects of the invention with reference to some embodiments in the sequence below:
A. Embodiment
  A-1. General Configuration of Fuel Cell System
  A-2. General Structure of Fuel Cell
  A-3. Manufacturing Method of Fuel Cell
  A-4. Other Means for Adjusting Pressure Loss
B. Modifications A. Embodiment A-1. General Configuration of Fuel Cell System FIG. 1 is a diagram illustrating the general configuration of a fuel cell system 100 according to one embodiment of the invention. The fuel cell system 100 is mounted on a vehicle and includes a fuel cell 10 configured to generate electricity by electrochemical reaction, a fuel gas system 60 arranged to supply a fuel gas to the fuel cell 10 and discharge the fuel gas from the fuel cell 10, an oxidizing gas system 70 arranged to supply an oxidizing gas to the fuel cell 10 and discharge the oxidizing gas from the fuel cell 10, a cooling system 80 arranged to cool down the fuel cell 10, and a control unit 90 configured to control the entire fuel cell system 100.

The fuel cell 10 is a polymer electrolyte fuel cell and is structured by stacking a plurality of cells. The fuel cell 10 receives a supply of hydrogen gas as the fuel gas and a supply of the air as the oxidizing gas and generates electricity through their electrochemical reaction.

According to this embodiment, the fuel cell 10 includes a plurality of ordinary cells 12 having ordinary power generation performance and a monitor cell 14 configured to be more likely to degrade the power generation performance than the ordinary cells 12. More specifically, the pressure loss of the hydrogen gas supplied to the anode of the monitor cell 14 is made greater than the pressure loss of the hydrogen gas supplied to the anodes of the ordinary cells. Accordingly, the monitor cell 14 is more likely to be deficiency of the hydrogen gas and is more likely to degrade the power generation performance, compared with the ordinary cells 12. The monitor cell 14 is specified as a monitoring target of a monitor 92 included in the control unit 90. The details of the monitor cell 14 will be described later.

The fuel gas system 60 includes a hydrogen tank 61, a shutoff valve 62, a regulator 63, a gas liquid separator 66, a circulation pump 68, a purge valve 69 and pipings 64, 65, 67a and 67b.

The hydrogen gas stored in the hydrogen tank 61 is supplied as the fuel gas through the piping 64 to the anodes of the fuel cell 10. The shutoff valve 62 and the regulator 63 are operated to regulate the pressure of the hydrogen gas and the amount of supply of the hydrogen gas to the fuel cell 10.

Exhaust gas from the anodes (hereinafter also referred to as anode off gas) is introduced through the piping 65 to the gas liquid separator 66. The gas liquid separator 66 separates hydrogen gas unconsumed in the course of power generation from water included in the anode off gas. The hydrogen gas separated by the gas liquid separator 66 is circulated through the piping 67a, the circulation pump 68 and the piping 64 to the fuel cell 10.

The piping 67b is branched off from between the gas liquid separator 66 and the circulation pump 68, and the purge valve 69 is provided on this piping 67b. The purge valve 69 is normally closed, so that the anode off gas is circulated to the fuel cell 10. As the concentration of impurities such as nitrogen gas and water vapor included in the anode off gas increases, however, the purge valve 69 is opened at a predetermined timing to introduce the anode off gas through the piping 67b to a diluter 76 and discharge out of the fuel cell system 100. This results in removing the impurities such as nitrogen gas and water vapor from the anode side and thereby suppress an increase in concentration of the impurities on the anode side.

The oxidizing gas system 70 includes an air cleaner 71, an air compressor 72, a diluter 76 and pipings 73, 74 and 77. The air taken in from the air cleaner 71 is compressed by the air compressor 72 and is supplied as the oxidizing gas through the piping 73 to the cathodes of the fuel cell 10. Exhaust gas from the cathodes (hereinafter also referred to as cathode off gas) is introduced through the piping 74 to the diluter 76.

The diluter 76 mixes the cathode off gas with the anode off gas introduced into the diluter 76 at the above predetermined timing, so as to dilute the concentration of hydrogen included in the anode off gas. The exhaust gas discharged from the diluter 76 is flowed through the piping 77 and is discharged out of the fuel cell system 100.

The cooling system 80 includes a radiator 81, a circulation pump 82 and pipings 83 and 84. The pipings 83 and 84 are connected with the fuel cell 10 and with the radiator 81. Cooling water flowing in the pipings 83 and 84 is circulated between the fuel cell 10 and the radiator 81 by the pressure of the circulation pump 82. Accordingly, heat generated in the course of the electrochemical reaction of the fuel cell 10 is absorbed by the circulating cooling water, and the heat absorbed by the cooling water is released by the radiator 81. As a result, the temperature of the fuel cell 10 is kept to adequate temperature.

The control unit 90 is implemented by a microcomputer including a CPU, a RAM and a ROM and is configured to load a program, which is stored in the ROM, on the RAM and execute the program. The control unit 90 includes a controller 91 configured to control the fuel cell system 100 and a monitor 92 configured to monitor the voltage of the monitor cell 14.

The controller 91 outputs driving signals to, for example, the regulator 63, the air compressor 72 and the purge valve 69, based on an output request 95 given by the vehicle and the state of voltage of the monitor cell 14, so as to control the fuel cell system 100. The monitor 92 monitors the voltage of the monitor cell 14 at every monitoring cycle T. When the monitor cell 14 becomes deficient of hydrogen and has a voltage drop, the monitor 92 detects the voltage drop of the monitor cell 14. When the monitor 92 detects the voltage drop of the monitor cell 14, the controller 91 limits the output current of the fuel cell 10, so as to suppress a further voltage drop of the monitor cell 14.

A-2. General Structure of Fuel Cell

Figure 2:
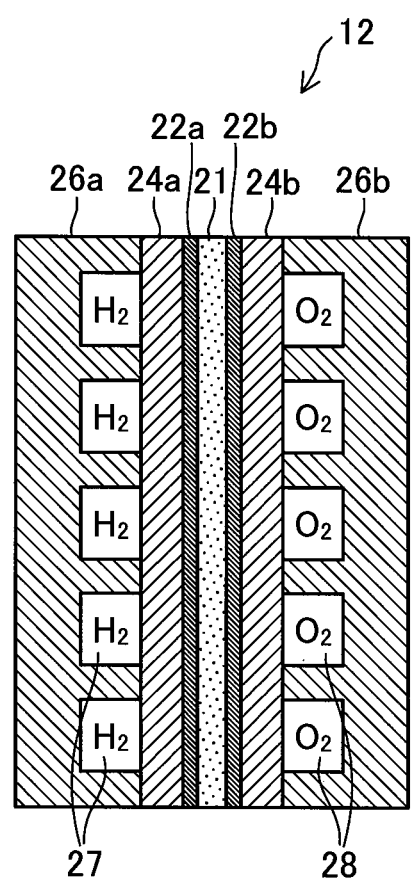
FIG. 2 is a diagram illustrating the cross sectional structure of an ordinary cell.

FIG. 2 is a diagram illustrating the cross sectional structure of the ordinary cell 12. The ordinary cell 12 includes an electrolyte membrane 21, an anode 22a and a cathode 22b formed on the respective surfaces of the electrolyte membrane 21, gas diffusion layers 24a and 24b placed on the respective outer sides of and across the anode 22a and the cathode 22b and separators 26a and 26b placed on the respective outer sides of and across the gas diffusion layers 24a and 24b. The structure of the monitor cell 14 is approximately the same as that of the ordinary cell 12, except the presence of means for increasing the pressure loss. The means for increasing the pressure loss will be described later.

The electrolyte membrane 21 is made of a solid polymer having the proton conductivity in the wet state. Each of the anode 22a and the cathode 22b is provided as an electrode having a catalyst supported on an electrically conductive carrier. According to this embodiment, each of the anode 22a and the cathode 22b includes carbon particles with a platinum catalyst supported thereon and an electrolyte equivalent to the polymer electrolyte constituting the electrolyte membrane 21.

The gas diffusion layers 24a and 24b serve as flow passages for the gases subjected to the electrochemical reaction and also serve as members for collecting electricity. The gas diffusion layers 24a and 24b may be made of a gas-permeable electrically-conductive material, such as carbon paper, carbon cloth, metal mesh or metal foam.

The separators 26a and 26b are made of a gas-impermeable electrically-conductive material, such as compressed carbon or stainless steel. The separators 26a and 26b respectively have surfaces formed to have predefined concavo-convex structures. The concavo-convex structure forms a fuel gas flow path 27 for making the flow of hydrogen gas as the fuel gas between the separator 26a and the gas diffusion layer 24a. Similarly, the concavo-convex structure forms an oxidizing gas flow path 28 for making the flow of oxygen as the oxidizing gas between the separator 26b and the gas diffusion layer 24b.

Grooves are formed on a surface opposite to the fuel gas flow path 27 of the separator 26a and on a surface opposite to the oxidizing gas flow path 28 of the separator 26b, although not being illustrated in the cross section. These grooves serve as cooling water flow paths for the flow of cooling water to regulate the temperature of the ordinary cell 12.

Figure 3:
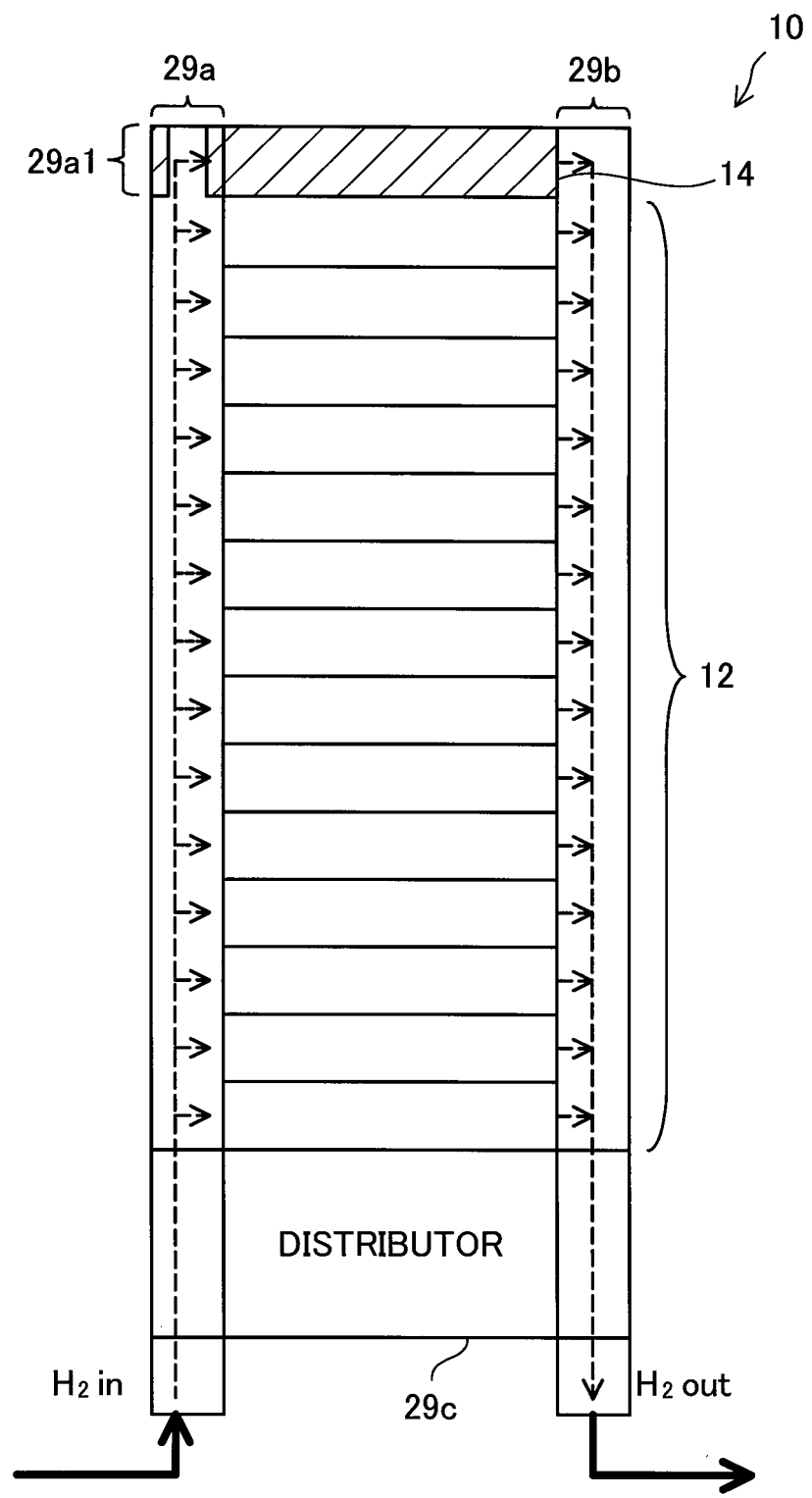
FIG. 3 is a diagram schematically illustrating the state that the pressure loss at the anode of a monitor cell is greater than the pressure loss at the anodes of ordinary cells.

FIG. 3 is a diagram schematically illustrating the state that the pressure loss at the anode of the monitor cell 14 is greater than the pressure loss at the anodes of the ordinary cells 12 in the fuel cell 10. As shown in FIG. 3, the fuel cell 10 includes the plurality of ordinary cells 12, the monitor cell 14, a hydrogen gas supply manifold 29a, a hydrogen gas discharge manifold 29b and a distributor 29c. According to this embodiment, in the hydrogen gas supply manifold 29a, a supply port 29a1 for supplying the hydrogen gas to the monitor cell 14 is made narrower than the other supply ports for supplying the hydrogen gas to the ordinary cells 12. This results in increasing the pressure loss at the anode of the monitor cell 14 compared with the pressure loss at the anode of the ordinary cell 12. Another means for increasing the pressure loss will be described later.

A-3. Manufacturing Method of Fuel Cell

Figure 4:
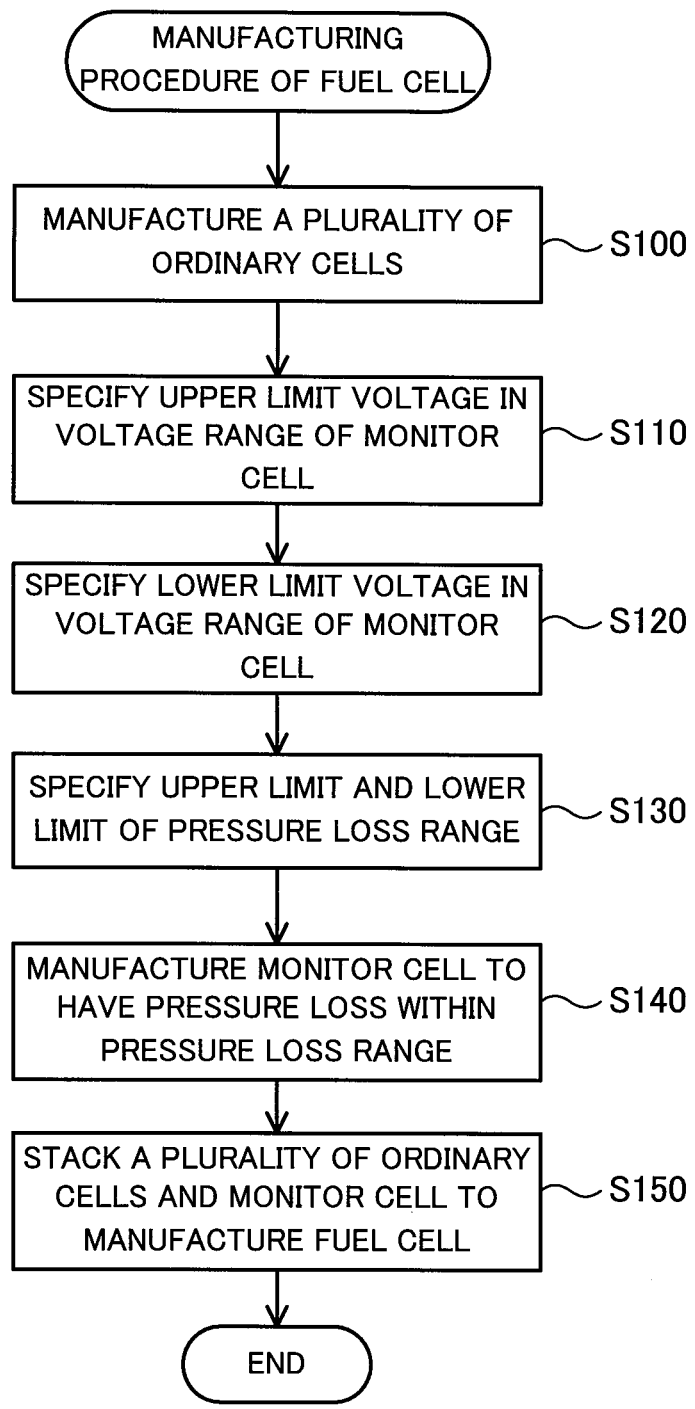
FIG. 4 is a flowchart showing a manufacturing procedure of a fuel cell.

FIG. 4 is a flowchart showing a manufacturing procedure of the fuel cell 10. At step S100, the procedure manufactures a plurality of the ordinary cells 12. At step S110, the procedure specifies an upper limit voltage V1 in a voltage range of the monitor cell 14. More specifically, the procedure individually measures the voltages of the plurality of ordinary cells 12 and determines an average voltage Vm of the plurality of ordinary cells 12. The procedure then specifies a value obtained by subtracting a predefined value from the average voltage Vm, as the upper limit voltage V1 in the voltage range.

At step S120, the procedure specifies a lower limit voltage V2 in the voltage range of the monitor cell 14. More specifically, the procedure determines a voltage drop rate of the ordinary cell 12 under a predetermined condition, subsequently determines a degree of voltage drop of the ordinary cell 12 which is dropped during the monitor cycle T of the monitor 92 configured to monitor the voltage of the monitor cell 14, from the voltage drop rate, and specifies the voltage drop degree as the lower limit voltage V2.

At step S130, the procedure specifies an upper limit value and a lower limit value of a pressure loss range of the hydrogen gas in the monitor cell 14, based on the upper limit voltage V1 and the lower limit voltage V2. More specifically, the procedure specifies the upper limit value and the lower limit value of the pressure loss range of the hydrogen gas in the monitor cell 14, in order to limit the voltage of the monitor cell 14 in the range between the upper limit voltage V1 and the lower limit voltage V2.

At step S140, the procedure manufactures the monitor cell 14, such that the pressure loss of the hydrogen gas in the monitor cell 14 is limited between the upper limit value and the lower limit value which defines the pressure loss range specified at step S130. At step S150, the procedure stacks the plurality of ordinary cells 12 and the monitor cell 14 to manufacture the fuel cell 10.

In the fuel cell 10 manufactured by the above manufacturing method, the voltage of the monitor cell 14 is equal to or less than the value obtained by subtracting the specified value from the average voltage of the plurality of ordinary cells 12. The monitor cell 14 can thus effectively work as the monitoring target of the monitor 92. Additionally, the configuration of this fuel cell 10 can suppress the monitor cell 14 from having a negative voltage even when the voltage of the monitor cell 14 is dropped under the predetermined condition.

The following describes the reason why this manufacturing method is employed, along with the desired performance of the monitor cell 14. According to this embodiment, the pressure loss at the anode of the monitor cell 14 is made greater than the pressure loss at the anode of the ordinary cell 12, so that the monitor cell 14 responds to the state of deficiency of hydrogen in which the supply of hydrogen gas to the fuel cell 10 is deficient, at the higher sensitivity than the ordinary cell 12; in other words, so that the voltage of the monitor cell 14 starts decreasing prior to a decrease in voltage of the ordinary cell 12 in this state.

When the difference between the pressure loss at the anode of the monitor cell 14 and the pressure loss at the anode of the ordinary cell 12 (hereinafter referred to as pressure loss difference) is too small, the response of the monitor cell 14 (voltage drop) to the state of deficiency of hydrogen is not significantly different from the response of the ordinary cell 12 to the state of deficiency of hydrogen. The monitor cell 14 may thus not sufficiently serve as the sensor.

When the pressure loss difference is too large, on the other hand, the voltage of the monitor cell 14 may be decreased excessively to or below 0 V (negative voltage) and may cause degradation of the monitor cell 14 in the state that hydrogen is deficient during warm-up operation in a subzero environment or in the state that the electrolyte membrane 21 included in the cell is excessively dried (hereinafter referred to as dry-up state) during high-temperature operation at or over 90° C. Especially the phenomenon that the monitor cell 14 has a negative voltage in the dry-up state is likely to occur when hydrogen becomes deficient during high-temperature operation.

This embodiment discusses the allowable range of the pressure loss difference at the anode between the monitor cell 14 and the ordinary cell 12 in order to avoid such a situation described above. The following discusses the desired range of the voltage of the monitor cell 14, prior to discussion on the pressure loss difference at the anode between the monitor cell 14 and the ordinary cell 12.

Figure 5:
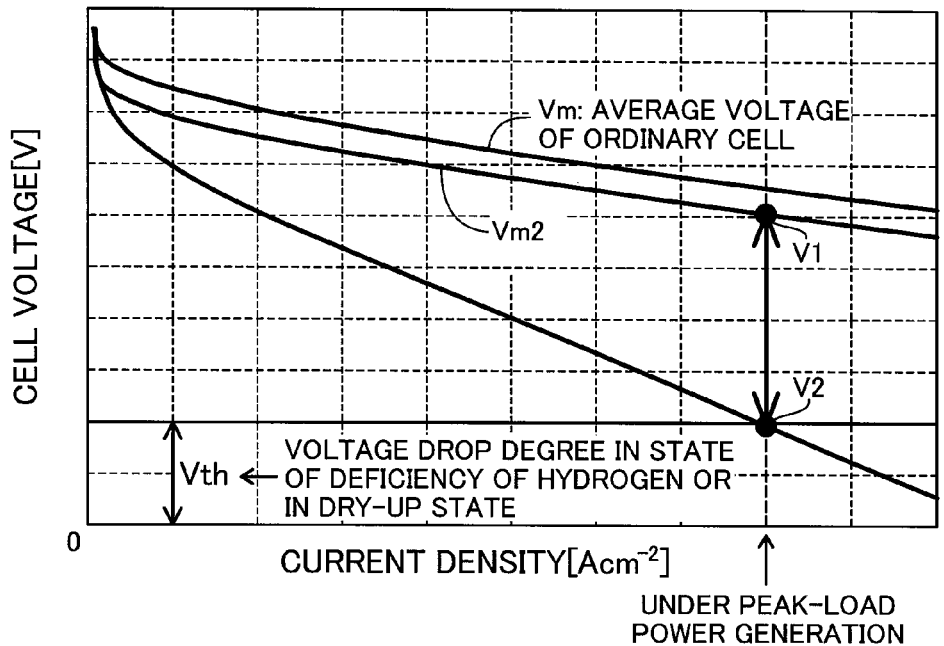
FIG. 5 is a graphical diagram showing the relationship of the current density to the voltage of the respective cells.

FIG. 5 is a graphical chart showing the relationship of the current density to the voltage of the respective cells. FIG. 5 shows an average voltage Vm of the ordinary cell 12 determined from the respective measured voltages of a plurality of ordinary cells 12. A curve of a voltage Vm2 is shown below a curve of the average voltage Vm. This voltage Vm2 is obtained by determining a standard deviation $\sigma$ of the voltage of the plurality of ordinary cells 12 and subtracting $3\sigma$, which is three-fold of this standard deviation $\sigma$, from the average voltage Vm. FIG. 5 also shows a voltage drop degree Vth of the cell in the state of deficiency of hydrogen or in the dry-up state.

As shown in FIG. 5, the voltage of the respective cells decreases with an increase in current density. This embodiment notes a cell voltage under peak-load power generation of the fuel cell 10 and specifies the voltage Vm2 under peak-load power generation as the upper limit voltage V1, while specifying the voltage drop degree Vth as the lower limit voltage V2.

It is preferable that the voltage of the monitor cell 14 under peak-load power generation is not higher than the upper limit voltage V1. This causes the voltage of the monitor cell 14 to be clearly distinguishable from the voltage of the ordinary cell 12 and is likely to make the voltage of the monitor cell 14 lower than the voltages of substantially all the ordinary cells 12. This enables the monitor cell 14 to effectively work as the monitoring target of the monitor 92.

It is also preferable that the voltage of the monitor cell 14 under peak-load power generation is not lower than the lower limit voltage V2. This suppresses the voltage of the monitor cell 14 from decreasing to or below 0 V (negative voltage) even in the case of a voltage drop of the monitor cell 14 in an abnormal state, for example, in the state of deficiency of hydrogen or in the dry-up state. This accordingly suppresses degradation of the monitor cell 14.

As described above, it is preferable that the voltage of the monitor cell 14 under peak-load power generation is within the range between the upper limit voltage V1 and the lower limit voltage V2.

The following describes the allowable range of the pressure loss difference at the anode between the monitor cell 14 and the ordinary cell 12, in order to limit the voltage of the monitor cell 14 under peak-load power generation to the range between the upper limit voltage V1 and the lower limit voltage V2. The detailed procedure of determining the upper limit voltage V1 and the lower limit voltage V2 (=voltage drop degree Vth) will be described later.

Figure 6:
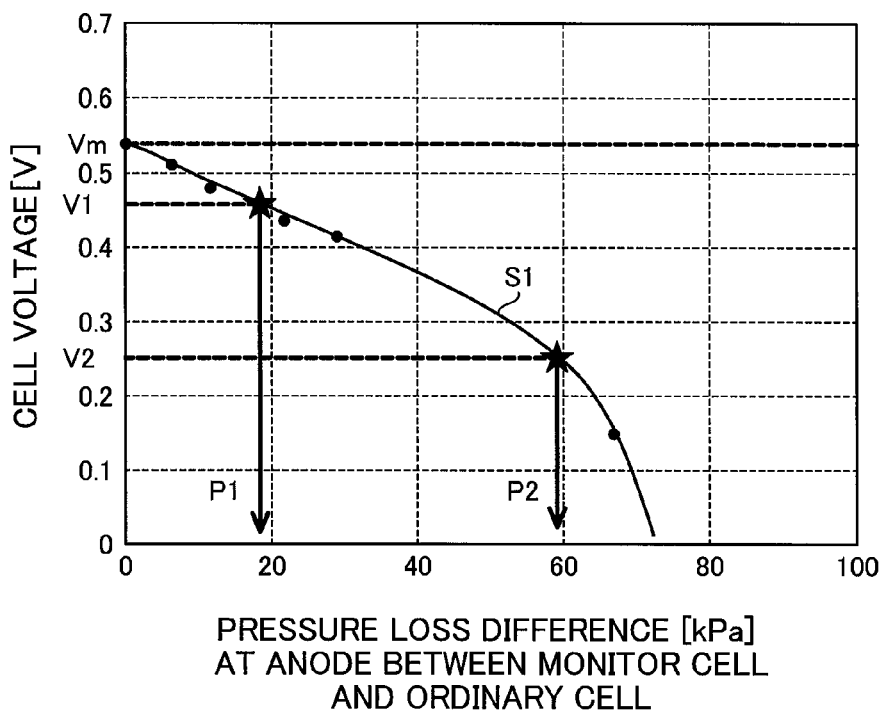
FIG. 6 is a graphical chart showing the relationship of the pressure loss difference at the anode between the monitor cell and the ordinary cell to the voltage of the monitor cell under peak-load power generation.

FIG. 6 is a graphical chart showing the relationship of the pressure loss difference at the anode between the monitor cell 14 and the ordinary cell 12 to the voltage of the monitor cell 14 under peak-load power generation. FIG. 6 shows the average voltage Vm of the plurality of ordinary cells 12, the upper limit voltage V1 and the lower limit voltage V2 (=voltage drop degree Vth). The respective points shown in FIG. 6 are data obtained by measuring the voltages of monitor cells 14 having various pressure loss differences at the anode. A curve S1 is a line smoothly connecting these data. As shown in FIG. 6, the voltage of the monitor cell 14 decreases with an increase in pressure loss difference at the anode between the monitor cell 14 and the ordinary cell 12.

The pressure loss difference at the intersection between the upper limit voltage V1 and the curve S1 is specified as P1, whereas the pressure loss difference at the intersection between the lower limit voltage V2 and the curve S1 is specified as P2. It is then understandable that limiting the pressure loss difference at the anode between the monitor cell 14 and the ordinary cell 12 to the range between P1 and P2 causes the voltage of the monitor cell 14 under peak-load power generation to be limited to the range between the upper limit voltage V1 and the lower limit voltage V2.

Accordingly, adjusting the pressure loss difference at the anode between the monitor cell 14 and the ordinary cell 12 to be within the range between P1 and P2 enables the voltage of the monitor cell 14 to be limited to the range between the upper limit voltage V1 and the lower limit voltage V2 and provides the optimum performance of the monitor cell 14. The method of adjusting the pressure loss difference at the anode between the monitor cell 14 and the ordinary cell 12 will be described later.

The following describes the procedure of determining the upper limit voltage V1.

Figure 7:
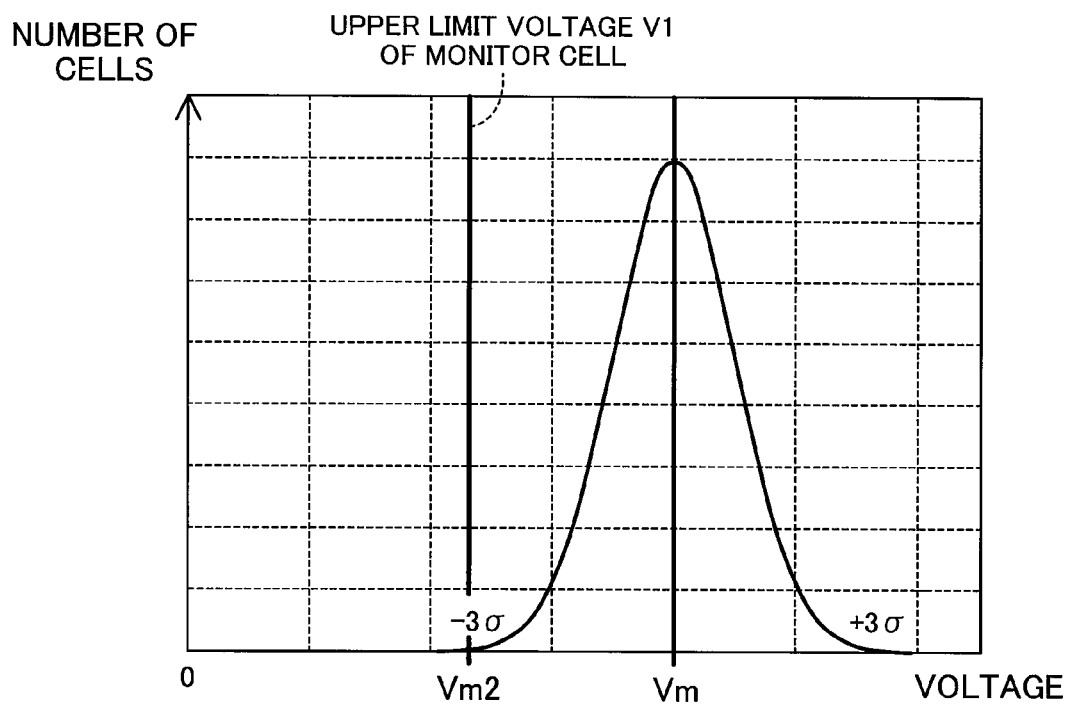
FIG. 7 is a graphical chart showing a distribution of voltage of a plurality of ordinary cells.

FIG. 7 is a graphical chart showing a distribution of voltage of a plurality of ordinary cells 12. FIG. 7 shows the measurement result of the number of ordinary cells 12 in voltage divisions of 0.05 V when the voltage of the plurality of ordinary cells 12 is measured under the same operating condition. As shown in FIG. 7, the measurement of the voltage of the plurality of ordinary cells 12 gives an approximately normal distribution of voltage. As described above, the procedure of this embodiment calculates the standard deviation $\sigma$ of the voltage of the plurality of ordinary cells 12. The procedure then specifies the value Vm2 obtained by subtracting $3\sigma$ from the average voltage Vm of the plurality of ordinary cells 12 as the upper limit voltage V1. As shown in FIG. 7, there is substantially no ordinary cell 12 having the voltage lower than the upper limit voltage V1. Accordingly, it is understandable that controlling the voltage of the monitor cell 14 to or below the upper limit voltage V1 enables the monitor cell 14 to effectively work as the monitoring target of the monitor 92.

Figure 8:
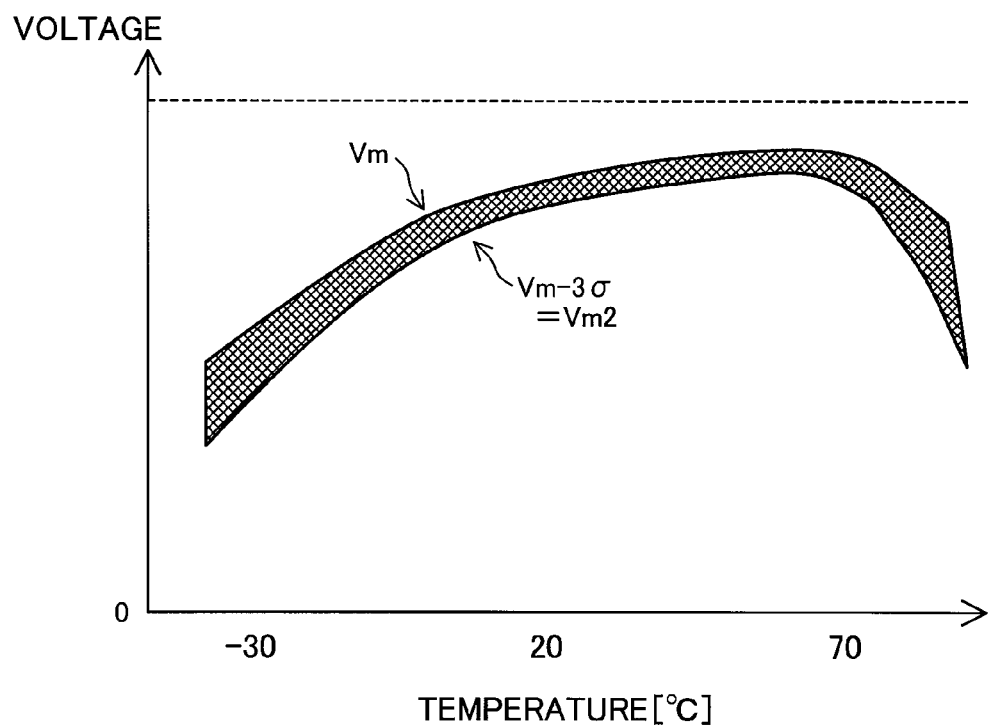
FIG. 8 is a graphical chart showing the relationship of temperature to an average voltage Vm and a voltage Vm2.

FIG. 8 is a graphical chart showing the relationship of the temperature to the average voltage Vm and the voltage Vm2. As shown in FIG. 8, the difference between the average voltage Vm and the voltage Vm2, i.e., a variation in voltage of the respective cells, significantly differs according to the temperature. More specifically, the variation in voltage of the respective cells increases in a lower temperature range and in a higher temperature range. It is accordingly preferable that the upper limit voltage V1 (=voltage Vm2) and P1 are determined under a temperature condition that maximizes the variation in voltage of the respective cells.

The following describes the procedure of determining the voltage drop degree Vth corresponding to the lower limit voltage V2. According to this embodiment, the voltage drop degree Vth includes a voltage drop degree Vth1 in the state of deficiency of hydrogen under rapid warm-up operation and a voltage drop degree Vth2 in the dry-up state during high-temperature operation.

Figure 9:
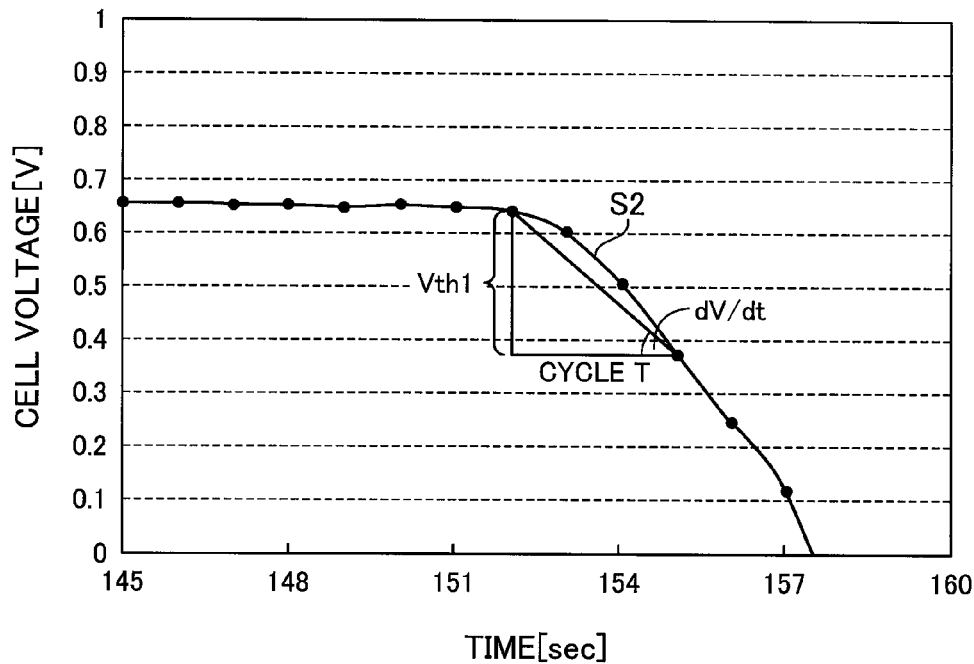
FIG. 9 is a graphical chart showing the elapse of time of rapid warm-up operation to the cell voltage.

FIG. 9 is a graphical chart showing the relationship of the elapse of time of rapid warm-up operation to the cell voltage. As shown in FIG. 9, the respective cells are likely to become deficient of hydrogen and have a voltage decrease during rapid warm-up operation in a subzero environment of or below 0° C. The voltage decreasing to a negative voltage of or below 0 V may cause degradation of the cells.

The procedure of this embodiment accordingly determines a voltage drop rate [dV/dt] based on the slope of a curve S2 shown in FIG. 9 and multiplies the voltage drop rate by the monitoring cycle T of the monitor 92, so as to determine the voltage drop degree Vth1 during the monitoring cycle T. In this embodiment, the voltage drop degree Vth1 takes a positive value in the state of a voltage drop.

The following describes the reason why the product of the voltage drop rate and the monitoring cycle T is employed as the voltage drop degree Vth1. As described above, the monitor 92 monitors the voltage of the monitor cell 14 at every monitoring cycle T. When the monitor cell 14 becomes deficient of hydrogen and has a voltage drop during rapid warm-up operation, the monitor 92 detects the voltage drop of the monitor cell 14. When the monitor 92 detects the voltage drop of the monitor cell 14, the controller 91 places a restriction on the output current of the fuel cell 10 and thereby suppresses a further voltage drop of the monitor cell 14. The voltage of the monitor cell 14 is accordingly dropped during only the monitoring cycle T at the maximum.

Figure 10:
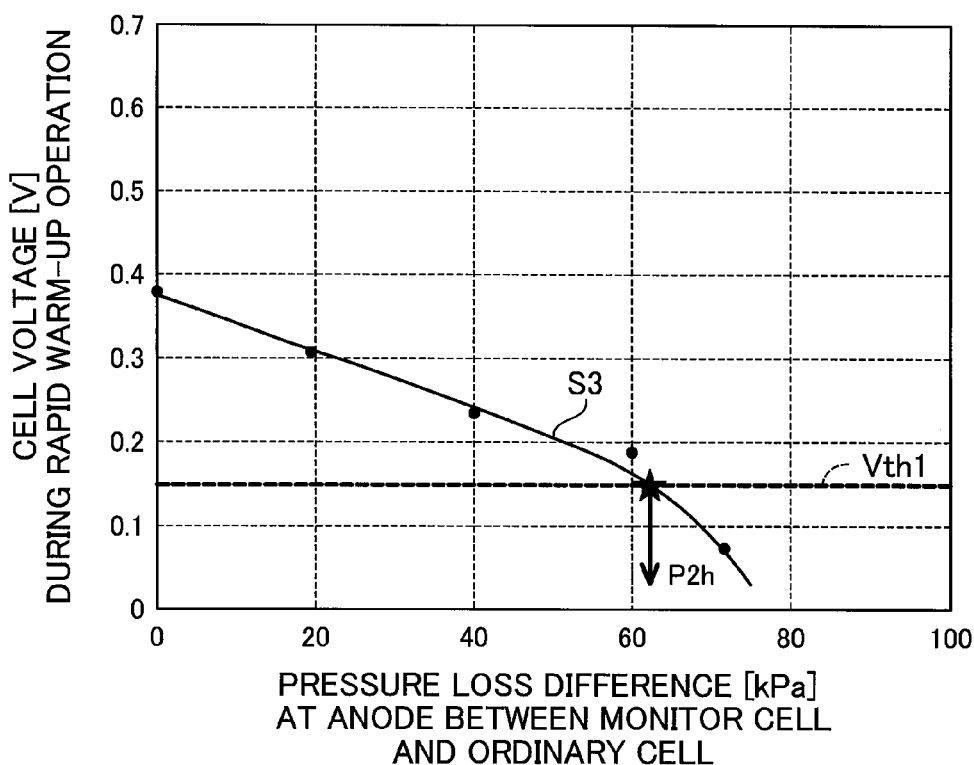
FIG. 10 is a graphical chart showing the relationship of the pressure loss difference at the anode between the monitor cell and the ordinary cell to the voltage of the monitor cell 14 under rapid warm-up operation.

FIG. 10 is a graphical chart showing the relationship of the pressure loss difference at the anode between the monitor cell 14 and the ordinary cell 12 to the voltage of the monitor cell 14 under rapid warm-up operation. FIG. 10 shows the voltage drop degree Vth1 in the state of deficiency of hydrogen. The pressure loss difference at the intersection of a curve S3 and the voltage drop degree Vth1 is specified as P2$h$. This value P2$h$ indicates an upper limit pressure loss difference that suppresses the monitor cell 14 from having a negative voltage in the stat of deficiency of hydrogen.

The procedure then determines the voltage drop degree Vth2 in the dry-up state. The procedure of determining the voltage drop degree Vth2 in the dry-up state is substantially the same as the procedure of determining the voltage drop degree Vth1 in the state of deficiency of hydrogen shown in FIG. 9. More specifically the procedure determines a voltage drop rate [dV/dt] based on the slope of a voltage drop in the dry-up state and multiples the voltage drop rate by the monitoring cycle T of the monitor 92, so as to determine the voltage drop degree Vth2 during the monitoring cycle T. The procedure then specifies P2d from the voltage drop width Vth2 with reference to a graph similar to FIG. 10. In this case, however, the ordinate of FIG. 10 should be replaced by "cell voltage under peak-load operation at high temperature". This value P2d indicates an upper limit pressure loss difference that suppresses the monitor cell 14 from having a negative voltage in the dry-up state.

The smaller between P2h (in the state of deficiency of hydrogen) and P2d (in the dry-up state) is specified as an upper limit pressure loss difference P2. The pressure loss difference between the monitor cell 14 and the ordinary cell 12 is then controlled to be equal to or less than P2.

This procedure suppresses the monitor cell 14 from having a negative voltage even in the case of a voltage drop of the monitor cell 14 in the state of deficiency of hydrogen or in the case of a voltage drop of the monitor cell 14 in the dry-up state.

A-4. Other Means for Adjusting Pressure Loss

The following describes other means for adjusting the pressure loss at the anode of the monitor cell 14 to be greater than the pressure loss at the anode of the ordinary cell 12. Any of the means described above and the means described below may be performed alone or in combination, such that the pressure loss at the anode of the monitor cell 14 is limited to the range between P1 and P2.

Means 1: Measure Adopted in Vicinity of Manifold

A plate serving as a resistance to the flow of hydrogen gas is placed at the portion of supplying the hydrogen gas to the monitor cell 14 in the hydrogen gas supply manifold 29a. More specifically, this reduces the opening area at the supply port of hydrogen gas, for example, by changing the length of a sealing plate provided in the monitor cell 14. The sealing plate works as a member to block the gas flow path in the cell and is provided on the separator.

The cross sectional area at the portion of supplying the hydrogen gas to the monitor cell 14 in the hydrogen gas supply manifold 29a is gradually decreased with a decrease in distance from the monitor cell 14.

Means 2: Measure Adopted in Vicinity of Separator

The surface of a sealing plate provided in the monitor cell 14 is coated with an ionomer or rubber. This changes the thickness of the sealing plate and reduces the opening area at the supply port of hydrogen gas.

The sealing plate provided in the monitor cell 14 is subjected to hydrophilization treatment.

The amount of rubber applied on the sealing plate provided in the monitor cell 14 is changed.

The shape of the flow path in the sealing plate provided in the monitor cell 14 is changed.

The width of the gas flow path in the monitor cell 14 is changed. More specifically, a membrane electrode assembly where the electrolyte membrane is joined with the catalyst electrodes is extended into the gas flow path, for example, by increasing the width of the gas flow path.

The gas flow path in the monitor cell 14 is coated with an ionomer. This reduces the cross sectional area of the gas flow path.

Means 3: Measure Adopted in Vicinity of Gas Diffusion Layer and Catalyst Layer

The porosity of the catalyst layer is decreased by increasing the degree of swelling of an ionomer in the catalyst layer of the monitor cell 14. It is preferable to decrease the weight ratio of the ionomer to carbon (I/C), in order to make the monitor cell 14 more likely to be in the dry-up state during high-temperature operation.

A readily crushable material is employed as the material for a micro porous layer (MPL) of the anode in the monitor cell 14. The micro porous layer is a layer formed on the surface of the gas diffusion layer and has finer pores than those of the gas diffusion layer.

The gas diffusion layer of the monitor cell 14 is sagged into the hydrogen gas flow path. More specifically, the gas diffusion layer is likely to be sagged into the hydrogen gas flow path, for example, by employing a material having low bending rigidity as the material of the gas diffusion layer or by increasing the width of the hydrogen gas flow path. Carbon fibers included in the gas diffusion layer are likely to be aligned in the roll length direction in a roll form. The gas diffusion layer accordingly has higher bending rigidity in the roll length direction than bending rigidity in the roll width direction. It is thus preferable to take into account the roll direction of the gas diffusion layer, in order to make the gas diffusion layer more likely to be sagged into the hydrogen gas flow path.

As described above, the procedure of this embodiment adjusts the pressure loss at the anode of the monitor cell 14, such that the voltage of the monitor cell 14 is limited to the range between the upper limit voltage V1 and the lower limit voltage V2. This suppresses the monitor cell 14 from having a negative voltage due to a voltage drop in the state of deficiency of hydrogen or in the dry-up state, while enabling the monitor cell 14 to effectively work as the monitoring target of the monitor 92.

B. Modifications

The invention is not limited to any of the above aspects and embodiments but may be implemented by any of various other aspects within the scope of the invention. Some examples of possible modification are given below.

B1. Modification 1

Figure 11:
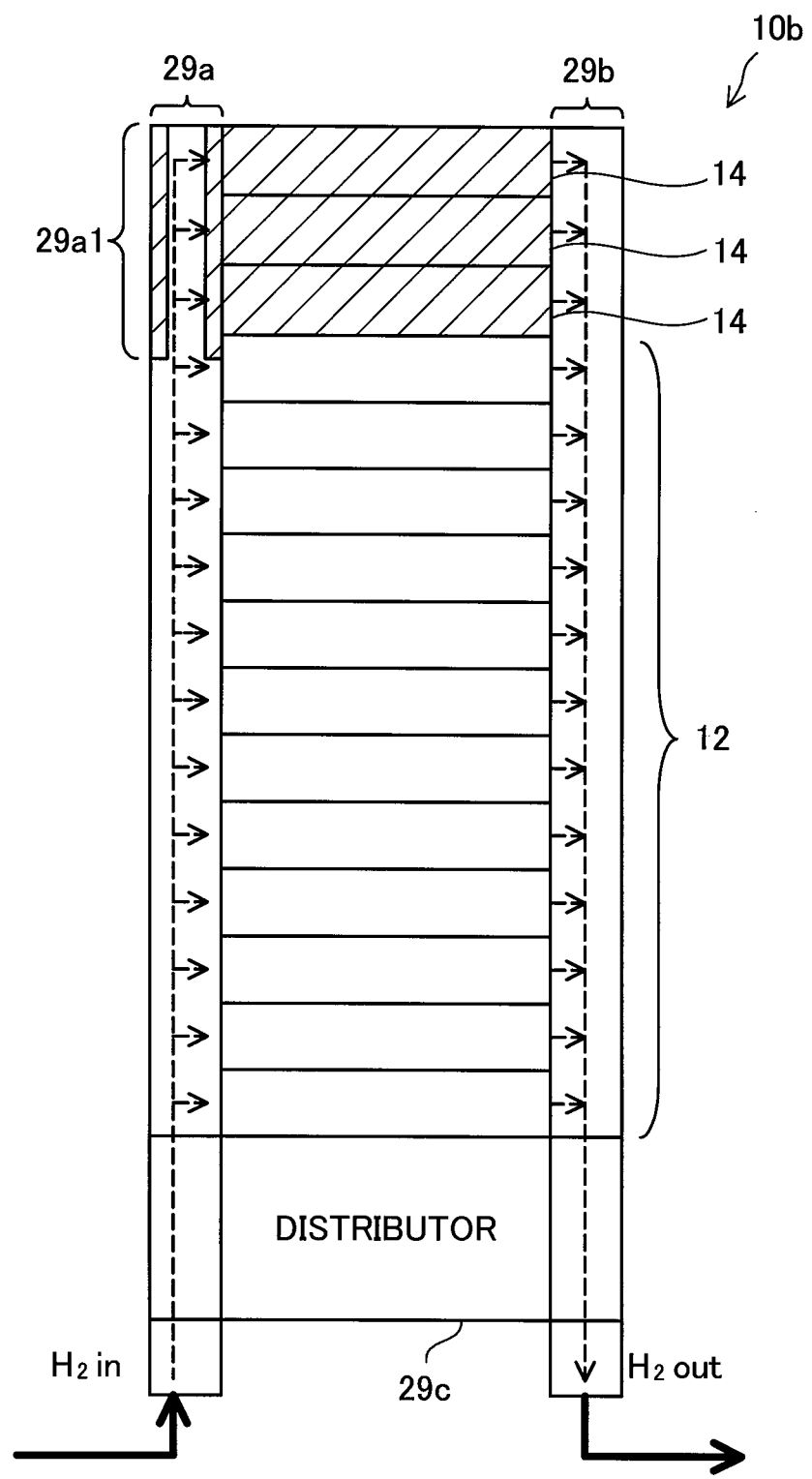
FIG. 11 is a diagram schematically illustrating the structure of a fuel cell 10b according to a modification.

FIG. 11 is a diagram schematically illustrating the structure of a fuel cell 10b according to a modification. The difference from the structure of the fuel cell 10 of the embodiment shown in FIG. 3 is providing three monitor cells 14. Otherwise the structure of the modification is the same as that of the embodiment. Like this modification, two or more monitor cells 14 may be provided.

B2. Modification 2

The procedure of the above embodiment makes an adjustment to cause the pressure loss at the anode of the monitor cell 14 to be greater than the pressure loss at the anode of the ordinary cell 12. Alternatively an adjustment may be made to cause the pressure loss at the cathode of the monitor cell 14 to be greater than the pressure loss at the cathode of the ordinary cell 12.

B3. Modification 3

The procedure of the above embodiment subtracts 3σ from the average voltage Vm to determine the upper limit voltage V1. Alternatively any other specified value, for example, 2σ, σ or 5% of the average voltage Vm may be subtracted from the average voltage Vm.

B4. Modification 4

The procedure of the above embodiment determines both the voltage drop degree Vth1 in the state of deficiency of hydrogen and the voltage drop degree Vth2 in the dry-up state, in order to determine the lower limit voltage V2. In other words, the procedure of the above embodiment determines two voltage drop rates under two different conditions and then determines two voltage drop degrees under the two different conditions. Alternatively, the voltage drop rate and the voltage drop degree may additionally be determined under another condition, or the voltage drop rate and the voltage drop degree may be determined under only one condition. For example, the procedure may determine only the voltage drop degree Vth1 in the state of deficiency of hydrogen or may determine only the voltage drop degree Vth2 in the dry-up state.

B5. Modification 5

The procedure of the above embodiment assumes that the voltage drop rate of the monitor cell 14 is approximately equal to the voltage drop rate of the ordinary cell 12 and determines the voltage drop degree Vth1 with reference to FIG. 9 using the ordinary cell 12. Alternatively the procedure may determine the voltage drop degree Vth1 using a test cell having similar structure to that of the monitor cell 14, instead of the ordinary cell 12.

B6. Modification 6

The above embodiment employs the pressure loss difference between the monitor cell 14 and the ordinary cell 12 as the abscissa of FIGS. 6 and 10. Alternatively the pressure loss of the monitor cell 14 may be employed as the abscissa of FIGS. 6 and 10.

B7. Modification 7

The above embodiment describes the fuel cell system 100 mounted on a vehicle. The fuel cell system 100 of the above embodiment may, however, be mounted on a moving body other than vehicle or may be provided as a stationary type.

B8. Modification 8

Part of the functions implemented by the software configuration in the above embodiment may be implemented by hardware configuration. Similarly part of the functions implemented by the hardware configuration may be implemented by software configuration.

The invention is not limited to any of the embodiments, the examples and the modifications described above but may be implemented by a diversity of other configurations without departing from the scope of the invention. For example, the technical features of the embodiments, examples or modifications corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

REFERENCE SIGNS LIST

10 Fuel cell
10b Fuel cell
12 Ordinary cell
14 Monitor cell
21 Electrolyte membrane
22a Anode
22b Cathode
24a Gas diffusion layer
24b Gas diffusion layer
26a Separator
26b Separator
27 Fuel gas flow path
28 Oxidizing gas flow path
29a Hydrogen gas supply manifold
29a1 Supply port
29b Hydrogen gas discharge manifold
29c Distributor
60 Fuel gas system
61 Hydrogen tank
62 Shutoff valve
63 Regulator
64 Piping
65 Piping
66 Gas liquid separator
67a Piping
67b Piping
68 Circulation pump
69 Purge valve
70 Oxidizing gas system
71 Air cleaner
72 Air compressor
73 Piping
74 Piping
76 Diluter
77 Piping
80 Cooling System
81 Radiator
82 Circulation pump
83 Piping
90 Control unit
91 Controller
92 Monitor
95 Output request
100 Fuel cell system

The invention claimed is:

1. A manufacturing method of a fuel cell including a plurality of ordinary cells and a monitor cell configured to have a greater pressure loss of hydrogen gas than a pressure loss of the ordinary cells, the manufacturing method comprising the steps of:
(a) specifying an upper limit voltage in a voltage range of the monitor cell;
(b) specifying a lower limit voltage in the voltage range of the monitor cell;
(c) determining an upper limit value and a lower limit value in a range of pressure loss of the hydrogen gas in the monitor cell, based on the upper limit voltage and the lower limit voltage; and
(d) manufacturing the monitor cell, such that the pressure loss of the hydrogen gas in the monitor cell is limited to the range of pressure loss.

2. The manufacturing method of the fuel cell according to claim 1,
wherein the step (a) comprises the steps of:
(a1) individually measuring voltages of the plurality of ordinary cells and determining an average voltage of the plurality of ordinary cells; and
(a2) specifying a value obtained by subtracting a specified value from the average voltage, as the upper limit voltage of the voltage range.

3. The manufacturing method of the fuel cell according to claim 1,
wherein the step (a) comprises the steps of:
(a-1) individually measuring voltages of the plurality of ordinary cells, and determining an average voltage of the plurality of ordinary cells and a standard deviation of voltage of the plurality of ordinary cells; and
(a-2) specifying a value obtained by subtracting a three-fold value of the standard deviation from the average voltage as the upper limit voltage of the voltage range.

4. The manufacturing method of the fuel cell according to claim 1,
wherein the step (c) comprises the steps of:

(c1) determining a relationship between pressure loss of the hydrogen gas in the monitor cell and voltage of the monitor cell; and (c2) specifying the range of pressure loss corresponding to the voltage range, based on the relationship.

5. The manufacturing method of the fuel cell according to claim 1, wherein the step (b) comprises the steps of:

(b1) determining a voltage drop rate of the ordinary cell in at least one of a state of deficiency of hydrogen and a dry-up state;

(b2) determining a degree of voltage drop of the ordinary cell which is dropped during a monitoring cycle of a monitor configured to monitor voltage of the monitor cell, based on the voltage drop rate; and (b3) specifying the voltage drop degree as the lower limit voltage.

6. The manufacturing method of the fuel cell according to claim 5, wherein the step (b1) comprises determining a plurality of voltage drop rates corresponding to the state of deficiency of hydrogen and the dry-up state respectively, as under a plurality of conditions, the step (b2) comprises determining a plurality of voltage drop degrees under the plurality of conditions, and the step (b3) comprises specifying the plurality of voltage drop degrees as a plurality of lower limit voltages, wherein the step (c) comprises determining a plurality of candidates for the upper limit value in the range of pressure loss and specifying a smallest candidate for the upper limit value among the plurality of candidates for the upper limit value, as the upper limit value in the range of pressure loss.

* * * * *